Figure 4:
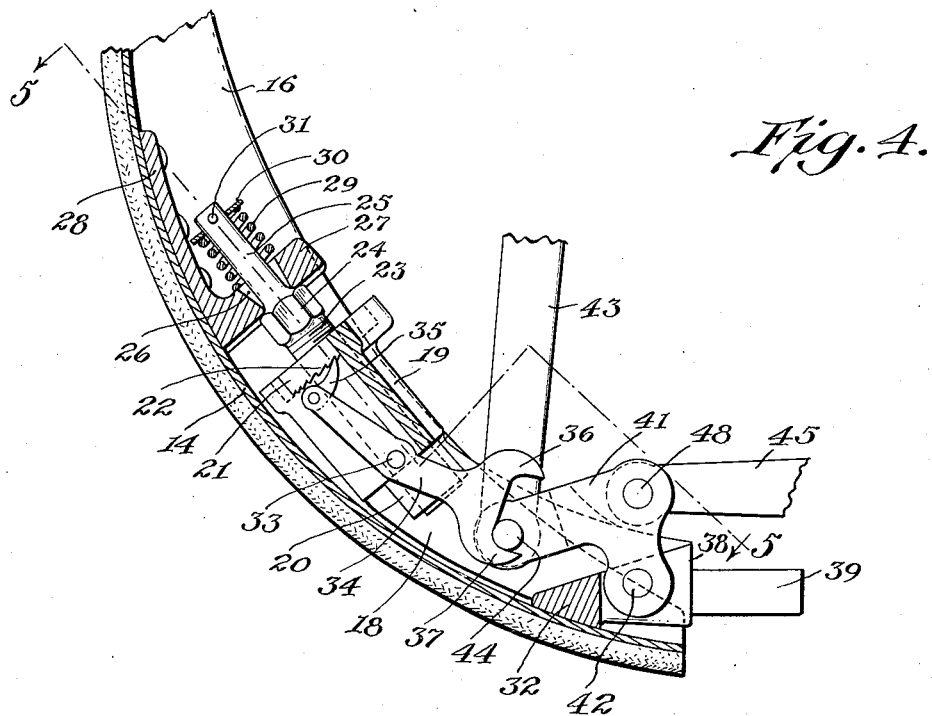

March 22, 1932.  G. L. SMITH  1,850,898
BRAKE CONSTRUCTION
Filed May 13, 1929   2 Sheets-Sheet 1
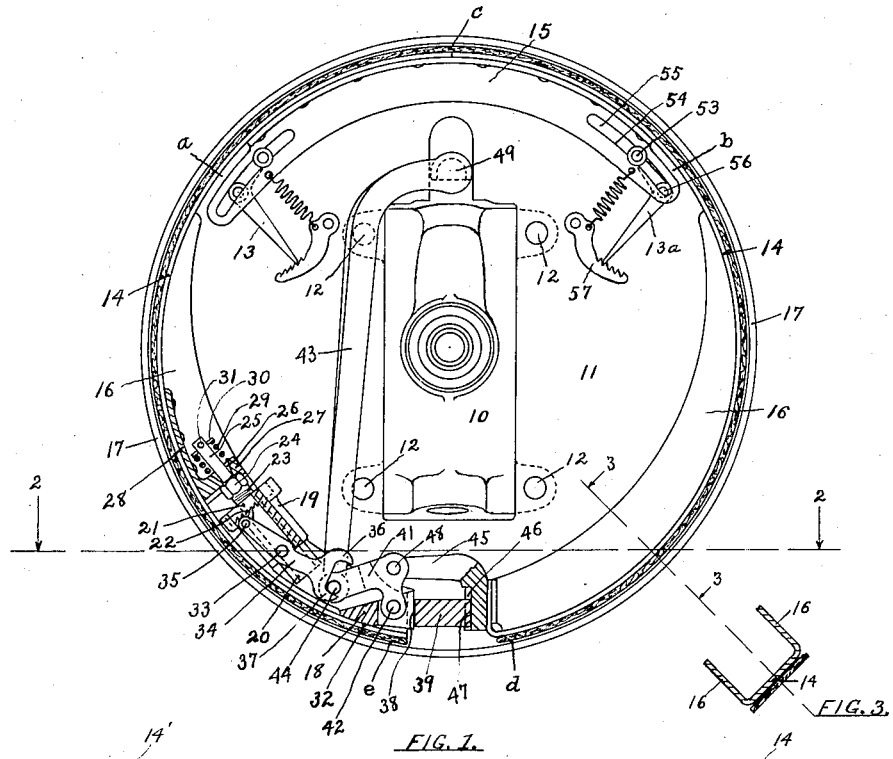
FIG. 1.
FIG. 3.
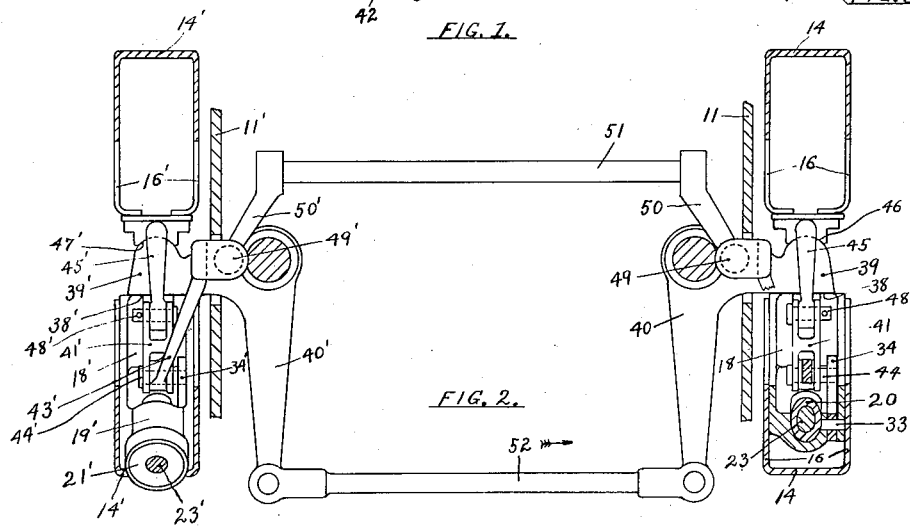
FIG. 2.
Lft.   Rt.
Inventor
George L. Smith.
By Henry T. Bright
Attorney March 22, 1932.  G. L. SMITH  1,850,898
BRAKE CONSTRUCTION
Filed May 13, 1929  2 Sheets-Sheet 2

Inventor
George L. Smith
By Henry T. Bright
Attorney

Patented Mar. 22, 1932                                                      1,850,898

UNITED STATES PATENT OFFICE

GEORGE L. SMITH, OF WASHINGTON, DISTRICT OF COLUMBIA, ASSIGNOR TO UNITED STATES ORDNANCE COMPANY, OF WASHINGTON, DISTRICT OF COLUMBIA, A CORPORATION OF VIRGINIA

BRAKE CONSTRUCTION

Application filed May 13, 1929. Serial No. 362,534.

My invention relates to brake construction and particularly to a construction for embodiment in automobile brake systems.

The object of my invention is to provide a self adjusting, self centering and self equalizing internal full wrap band type of brake construction for automobiles which will require no attention or adjustment until one or more of the brake bands of the including brake system is or are worn so badly as to require relining.

To accomplish the aforesaid object I combine in cooperative assembly a plurality of constructions individually identified as follows:

(a) A brake band that will hold its shape as far as possible.

(b) Automatic brake clearance adjusters for centering the band so that it will not drag.

(c) An automatic brake band slack adjuster to compensate for the wearing of the brake band lining.

(d) An equalizing mechanism for equalizing the braking effects of opposite brakes of an automobile brake system.

In the drawings chosen to illustrate my invention, the scope whereof is set forth in the appended claims, Fig. 1 is a side elevation partially in section of a right front brake of an automobile viewed from the right and constructed in accordance with my invention;

Fig. 2, a diagrammatic and sectional plan view of the right and left front brakes of an automobile constructed and interconnected in accordance with my invention, the same being taken on a line corresponding to the line 2—2 in Figure 1;

Fig. 3, a section on the line 3—3 of Fig. 1;

Figure 4, an enlarged view of the slack adjuster shown in Figure 1; and

Figure 5:
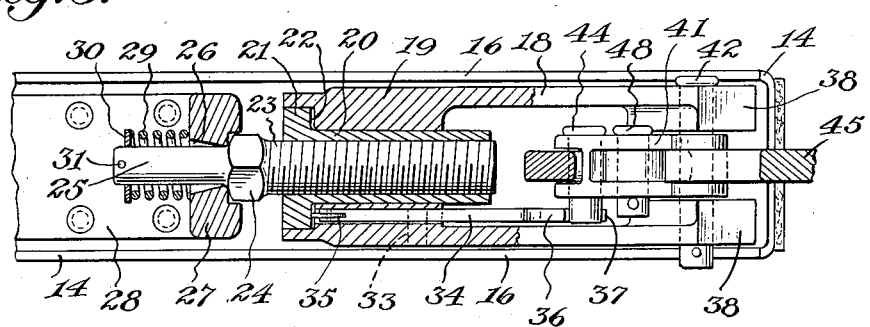

Figure 5, a section on the line 5—5 of Figure 4.

In the drawings and referring particularly to Figure 1, the numeral 10 represents the steering knuckle of an automobile front wheel to which the backing plate 11 is bolted by means of four bolts 12. The mechanisms numbered 13 and 13ª are my automatic clearance adjusters described in my Patent 1,795,237, issued March 3, 1931, and which keep the running clearance of the brake band 14 at these points substantially constant.

The brake band 14 is composed of two pressed steel halves joined together by the stiffener 15 welded or riveted to them. For about 120° either side of the ends of the band side flanges 16 and 16 are turned up to stiffen the band so it will better hold its shape. In the two gaps between the stiffener 15 and the side flanges 16 and 16 the band is free to flex as necessary to make proper contact with the brake drum 17. It is thus seen that my band is fairly rigid in three sections and flexible for a short distance between the middle section and either end section.

It will now be apparent that, with the clearance at the points $a$ and $b$ on the drum controlled, the clearance at point $c$ will also be controlled due to the stiff section of the band between these points. As the two clearance adjusters operate to control the running clearance between the band and drum, their combined action, when operated, is to raise the band bodily. When the band expands the sections stiffened by the side flanges 16 and 16 will swing towards the drum about a center near the points $a$ and $b$ and conversely in brake release movement they will swing inward towards the center of brake a small amount so that there will necessarily be some running clearance at the points $d$ and $e$. Thus my type of reinforced band in combination with my clearance adjusters insures proper centering of the band to maintain running clearance at all times regardless of wear of the brake lining.

To prevent the wear of brake lining from causing brake pedal to hit floor boards of an automobile and prevent brake application I mount on one end of the band an automatically operated slack adjuster consisting of a casting or body part 18 fitting between the flanges 16. The barrel portion 19 of this casting is bored to receive a sleeve 20 having a flange 21 at its upper end with ratchet teeth 22 on the lower side of this flange. Threaded into this sleeve is a screw 23 having a hex portion 24 and a smaller shank 25 fitting in a hole 26 in the end 27 of the abutment 28 riveted to the brake band. A spring 29, washer 30 and keeper pins 31 are provided to hold the hex 24 against the end 27. The hole 26 is tapered to permit a slight pivotal action of the shank 25 with respect to the band. Downward pivotal movement of the shank is limited by the stop 32 bearing against the brake band. Mounted on the pin 33 to one side of the sleeve 20 is a lever 34 having a pawl 35 pivoted to its upper end which engages the ratchet teeth 22. The other end of lever 34 is formed into an upper jaw 36 and a lower jaw 37. The lower end 38 of casting 18 is flat and when brake is off bears against a flat surface on short arm 39 of bell-crank 40. To this end 38 is pivoted one arm of a two-arm lever 41 by the pin 42. This lever is operated by a link 43 pivoted to its other arm by the pin 44 which latter is positioned between the jaws 36 and 37 of lever 34.

An arm 45 is secured to the end of brake band opposed to the casting 18 and said last named brake band end has a concave surface 46 which bears against the convex surface 47 of the bell-crank arm 39. The free end of the arm 45 is pivotally connected by the pin 48 to the lever 41. Thus an upward pull on link 43 will widen the gap between the ends of the band and force the latter into braking contact with the drum 17. The head 49 of link 43 is raised by a lever 50 secured to a cross shaft 51 and for applying the two brakes this cross shaft is rotated by any suitable lever such as a foot pedal (not shown), but it will be understood that the upward stroke of both right and left links 43 and 43′ are the same under all conditions as there is no equalizing yoke between right and left levers 50—50′.

It will be understood that the right and left brakes shown in Figure 2 are similarly constructed and that corresponding parts in the two brakes are numbered the same except that the designating numerals of the left hand brake have a prime character appended. Furthermore, it will be understood that the two brakes shown in Figure 2 are simultaneously applied through the instrumentality of the levers 50 and 50′ and the cross shaft 51, the latter being adapted for any suitable operating connection with a conventional brake foot pedal of an automobile.

I will describe the operation of the slack adjuster mechanism of each brake by reference solely to the parts of the right brake, which latter is applied by raising the head 49 of the link 43. This movement of said link raises the pivot pin 44, operates the lever 41 and expands the band as will be obvious. As the lining of the brake wears down the movement of the pivot pin 44 in effecting brake application increases until it eventually hits the upper jaw 36 of lever 34 and gradually pivots the lever 34 in increasing amounts, as the brake lining gradually wears, until pawl 35 picks up a tooth on ratchet 22. When this occurs jaw 37 will remain raised until the downward movement of pivot pin 44 in releasing the brake hits it and forces it back to its original position. As a result the sleeve 20 is rotated, the screw 23 traversed out, and the casting 18 moved to increase the effective length of the brake band, with resulting tightening of the latter.

In case one brake, the right brake for instance, is weak due possibly to oil on the brake lining or some other cause, the thrust of part 46 against curved face 47 of bell-crank would be reduced allowing this thrust of the opposite brake to swing the bell-crank 40′ and equalizing rod 52 in the direction of arrow and bell-crank 40 in a direction to rotate the right brake counter clockwise in Fig. 1. This rotation produces the same effect on lever 41 as that of a further upward movement of link 43, since the brake rotates about the axle center while the link 43 rotates about center 49 not in line with axle center; so that the result is a further application of the right brake to build up its power. With respect to the slack adjuster this involves movement of lever 34 to operate the ratchet and sleeve 20 sooner than would otherwise be the case. This adjustment for the stronger left brake would likewise be delayed by its rotation in a clockwise direction producing the effect of shortening the movement of pivot 44 with respect to lever 34. Thus the slack adjuster cooperates with the equalizing mechanism to tighten the weaker brake first even though the running clearance on that brake be less than on the other. This is accomplished by a variation in the stroke of the lever 34, and may be divided into two parts namely, First. A shortening of this stroke by rotation of the brake with its drum; and, Second. A lengthening of this stroke by rotation of the brake against the rotation of its drum.

In broad terms the mechanism for shortening or lengthening the stroke of lever 34 may be termed mechanism actuated by rotation of the brake to advance or retard the take up action of the slack adjuster. This take up action consists in the picking up of one of the ratchet teeth 22 on flange 21 and must always act to adjust the weaker brake first. Some of the claims submitted are intended to specifically cover this action by any means operated by a slight rotation of the brake band whether it be a cross-equalizing connection or not.

Likewise my clearance adjusters described in my aforesaid copending application will also operate sooner on the weaker brake since the increased pressure thrown on this brake will compress the brake lining more than on the other brake forcing the band nearer the drum and causing a take up action. This movement is produced by the pin 53 on bell-crank lever 13ª being carried outward by movement of band toward drum which operation is caused by pressure of the inside face 54 of slot 55 formed in the stiffening member 15 and the bell-crank is caused to rotate about its pivot 56 until the long arm of lever jumps a tooth on ratchet 57, all as fully described and illustrated in my Patent 1,795,237, issued March 3, 1931. This operation avoids possibility of the brake "dragging". With the running clearance considerably reduced to make up for loss of friction there would be great danger of the band ends dragging at the points $d$ and $e$ if these clearance adjusters did not operate to raise the band by a corresponding reduction of the clearances at $a$ and $b$. Thus it is seen that my clearance adjusters perform a very important function in conjunction with my slack adjuster mechanism as well as with my reinforced brake band, so important, in fact, that the slack adjuster would be useless without the other elements just specified as its expanding action on the band would cause same to drag at the points $d$ and $e$.

To summarize the coaction of the various parts described, it may be pointed out that the equalizing mechanism coacts with the slack-adjusters and the clearance adjusters to take up adjustment of and to center the band of the weaker brake before that of the stronger one so that the power of the weaker brake will be increased.

The clearance adjusters cooperate with the slack adjusters so that when the latter are operated to take up slack there will be no danger of the brake band dragging at or near the ends, due to the band not being properly centered.

The clearance adjusters cooperate with my reinforced band to keep a running clearance at all points on the periphery of the brake drum. They also cooperate with the short arm 39 of my equalizing bell-cranks to keep the band from moving about due to vibrations or bouncing of wheels on a rough road as follows: The arm 39 prevents a horizontal movement of lower portion of band to right or left, but permits a vertical movement whereas the two clearance adjusters 13 and 13ª acting in combination fix the vertical position of the band without preventing a right or left rotary movement to bring same to its proper off position.

It will be further noted that the body 18 of the slack adjuster is in contact with the inner face of the band 14 and along which band face it is adapted to be automatically extended as heretofore described. This contact of the body 18 with the inner face of the band 14 is an important feature of my invention. By this construction and arrangement the body 14 will, during brake application, be heated up rapidly by the band and expand with the latter, so that the take-up action will not work too fast as the band follows the heat produced expanding action of the drum. Were it not for this substantial uniform heating up of the band and the compression device due to contact between the band and the body 18, a too quick take-up action would occur, and the band being inside the drum and accordingly slower in cooling than the drum, an interval would occur when the brakes would be inclined to drag.

I distinguish the mechanisms herein described for adjusting and centering the brake band by the terms "slack adjuster" for the former function and "clearance adjuster" for the latter one. In other words, my clearance adjusters have no effect on the brake applying device, but keep the brake from dragging when not applied, while my slack adjuster keeps the brake applying device operative regardless of wear of the lining, but does not by itself alone control the position of the band to prevent it from dragging, but would tend to produce rather than prevent dragging of the brake when not applied.

The important function of the slack adjusters heretofore described is to tighten first the brake which produces the least braking torque, as in no other way can a set of automatically operated slack adjusters be made to maintain all of the brakes up to the same degree of efficiency. The present method is to tighten the brake having the greatest running clearance and the reason that my method of controlling the operation of the slack adjusters is superior to the present method is due to the fact that variations in the co-efficient of friction may result in the tightest brake being the weakest one, and in which case my method would tighten it first until it did exert as much braking power as the other brakes in association with the system.

I claim:

1. In a brake mechanism comprising duplicate internal expanding friction brakes and a common brake applying device, the combination of mechanism automatically intensifying the application of the brake having the lower frictional resistance and automatic clearance adjusters for each brake operated by the combined brake applying and intensifying movement produced by said device and said mechanism.

2. In a brake mechanism comprising duplicate internal expanding brakes and a common brake applying device the combination of mechanism automatically intensifying the application of the brake having the lower frictional resistance, automatic clearance adjusters for each brake and an automatic slack adjuster for each brake, said adjusters being operated by the combined brake applying and intensifying movement produced by said device and said mechanism.

3. In a brake mechanism comprising duplicate internal expanding friction brakes and a common brake applying device, the combination of mechanism automatically intensifying the application of the brake having the lower frictional resistance, and an automatic slack adjuster for each brake operated by the combined brake applying and intensifying movement produced by said device and said mechanism.

4. In a brake mechanism, the combination with an internal expanding brake adapted for limited rotational movement with its related drum: of a slack adjuster for adjusting said brake and means controlled by the rotational movement of said brake for automatically operating said slack adjuster.

5. In a brake mechanism, the combination with an internal expanding brake adapted for limited rotational movement with its related drum, of a slack adjuster for tightening said brake, and means for operating said slack adjuster, the operation of said means being retarded by rotational movement of said brake.

6. In a brake system comprising duplicate internal expanding brakes and a common brake applying device, the combination of mechanism permitting a limited rotational movement of said brakes, slack adjusters for tightening said brakes, and means for actuating said slack adjusters controlled by rotational movements of said brakes.

7. In a brake system comprising duplicate internal expanding brakes and a common brake applying device, the combination of mechanism permitting limited rotational movements of said brakes, slack adjusters for tightening said brakes, and means operated by said applying device for actuating said slack adjusters, said actuating movement being advanced or retarded by the rotational movements of said brakes.

8. In a brake mechanism comprising a plurality of internal expanding braking members operated by a common brake applying device, the combination of braking members producing a braking torque when applied by said device, a slack adjuster for each braking member, and means to automatically cause the operation of the slack adjuster of the braking member producing the least braking torque in advance of the slack adjusters of the other braking members.

9. In a brake mechanism comprising duplicate internal expanding braking members operated by a common brake applying device, the combination of braking members producing a braking torque, a slack adjuster for each braking member, and means controlling the operation of the slack adjusters to automatically cause the operation of the slack adjuster of the braking member exerting the lesser braking torque in advance of the slack adjuster of the other braking member.

10. In a brake mechanism comprising duplicate internal expanding friction brakes and a common brake applying device, the combination of mechanism automatically reducing the application of the brake having the greater frictional resistance, and an automatic slack adjuster for each brake operated by the combined brake applying and reducing movement produced by said device and said mechanism.

11. In a brake, a full wrap internal brake band, an anchor between and disconnected from the ends of the band, means for expanding the band, a thrust member carried by and projecting inwardly from the band, and an automatically extensible compression device mounted in contact with and extensible along the inner face of the band between the thrust member and anchor and having pivotal connection with the band expanding means.

12. In a brake, a braking member, brake applying means, and an automatically extensible compression device mounted in contact with and extensible along the inner face of the braking member and having pivotal connection with the brake applying means.

13. In a brake, a braking member, an automatically extensible device having sliding engagement with the inner face of the braking member at one end of said member and through which braking force is transmitted to the braking member, and means for applying braking force to the braking member through said device, said last named means including a lever having pivotal connection at one point with a part fixed to the other end of the braking member and pivotal connection at another point with said device.

14. In a brake, a braking member, an automatically extensible device having sliding engagement with the inner face of the braking member at one end of said member and through which braking force is transmitted to the braking member, and means for applying braking force to the braking member through said device, said last named means including a lever having pivotal connection at one point with a part connected to the other end of the braking member and pivotal connection at another point with said device.

15. In a brake, a braking member, a thrust member carried by the braking member, and an extensible compression device having sliding engagement with the inner face of the braking member and reacting from the thrust member, said device including mechanism for effecting its extension automatically, means for applying braking force to the braking member through said device, and two coöperating levers carried by the device, one of which is included in said brake force applying means and the other in the mechanism for effecting extension of said device.

16. In a brake, a brake member, brake applying means, an automatically extensible compression device operatively connected with the brake applying means, said device including a body in sliding engagement with the inner face of the brake member, a rotatable sleeve carried by the body, a non-rotatable screw on which the sleeve is threaded, a circumscribing ratchet fixed to the sleeve, a lever carried by the body and operable by the brake applying means during brake application, and means operable upon predetermined brake applying movement of the brake applying means to cause said lever to pick up the next tooth of the ratchet and rotate the sleeve as the brake is released.

17. In a brake, a braking member, an extensible device in sliding engagement with and movable along the inner face of the braking member, means for applying braking force to the braking member through said device, said means including a lever pivoted to the device, a member movable in one direction by brake applying movement of said lever, means for moving said member in the opposite direction during the following brake release, and means operated by the latter movement of the member to extend said device when said first movement is of predetermined extent.

18. In a brake mechanism, an internal expansible brake element, an abutment on said element, and an adjustable compression device including a portion in sliding engagement with and movable along the inner face of the brake element to vary the effective length of the latter, and also including a nut and screw adjustment for said portions reacting from such abutment.

19. In a brake mechanism, the combination of a brake drum, an internal expanding brake element engageable with said drum, an automatic slack adjuster for adjusting said element, and a yielding brake anchor, the yielding of which retards the adjusting movement of said slack adjuster.

In testimony whereof I hereunto affix my signature.

GEORGE L. SMITH.